(12) United States Patent
Aldrich et al.

(10) Patent No.: US 6,713,116 B1
(45) Date of Patent: Mar. 30, 2004

(54) SWEET-STABLE ACIDIFIED BEVERAGES

(75) Inventors: Jessica A. Aldrich, Hazlet, NJ (US); Lisa Y. Hanger, Basking Ridge, NJ (US); Guido Ritter, Laer (DE)

(73) Assignee: Nutrinova Inc., Somerset, NJ (US)

( * ) Notice: Subject to any disclaimer, the term of this patent is extended or adjusted under 35 U.S.C. 154(b) by 0 days.

(21) Appl. No.: 09/675,825

(22) Filed: Sep. 29, 2000

Related U.S. Application Data

(63) Continuation-in-part of application No. 09/186,275, filed on Nov. 5, 1998, now abandoned.
(60) Provisional application No. 60/079,408, filed on Mar. 26, 1998.

(51) Int. Cl.$^7$ ................................................ A23L 1/236
(52) U.S. Cl. ...................................... 426/590; 426/548
(58) Field of Search ................................ 426/548, 590, 426/658, 597

(56) References Cited

U.S. PATENT DOCUMENTS

| | | | |
|---|---|---|---|
| 4,737,375 A | 4/1988 | Nakel et al. ................. | 426/548 |
| 4,957,763 A | 9/1990 | Saita et al. .................. | 426/548 |
| 5,169,671 A * | 12/1992 | Harada et al. ............... | 426/658 |
| 5,380,541 A | 1/1995 | Beyts et al. ................. | 426/548 |
| 5,431,929 A | 7/1995 | Yatka et al. ................... | 426/3 |
| 5,731,025 A | 3/1998 | Mitchell ..................... | 426/548 |
| 6,322,835 B1 * | 11/2001 | De Soete et al. ........... | 426/453 |
| 6,372,277 B1 * | 4/2002 | Admiraal et al. ........... | 426/548 |

FOREIGN PATENT DOCUMENTS

| | | | |
|---|---|---|---|
| WO | WO 98/02049 | 1/1998 | ........... A23L/1/236 |
| WO | 98/04156 * | 2/1998 | |
| WO | WO 98/19564 | 5/1998 | ............. A23L/2/60 |

OTHER PUBLICATIONS

Widemann et al., "Synergistic Sweeteners", *Food Ingred. and Analysis Int.*, 19(6):51–52, 55–56 (abstract only), Dec. 1997.*

* cited by examiner

*Primary Examiner*—Keith Hendricks
(74) *Attorney, Agent, or Firm*—ProPat, L.L.C.

(57) ABSTRACT

Acidified beverages are prepared including an oligosaccharide such as inulin or oligofructose and a high intensity sweetener. In the acidic environment of the beverage, suitable oligosaccharides hydrolyze to their sweeter components, thus compensating for loss of high intensity sweetener due to its decomposition over time.

20 Claims, 3 Drawing Sheets

SWEET-STABLE ACIDIFIED BEVERAGES

CROSS-REFERENCE TO RELATED APPLICATION

The present application is a continuation-in-part of U.S. patent application Ser. No. 09/186,275, of J. Aldrich et al. for "Sweet-Stable Acidified Beverages", filed Nov. 5, 1998 now abandoned, which was based upon Provisional Application Serial No. 60/079,408, filed Mar. 26, 1998. The priority of the foregoing applications is hereby claimed.

TECHNICAL FIELD

The present invention relates generally to beverages with high-intensity sweeteners, and more particularly to acidified beverages containing oligosaccharides and at least one high-intensity sweetener.

BACKGROUND

Oligosaccharides are gaining in popularity as food ingredients. In U.S. Pat. No. 4,957,763 there is disclosed a sweetening agent consisting of galactooligosaccharide and aspartame. Certain oligosaccharides, especially non-digestible oligosaccharides such as inulin and oligofructose have the benefits of acting as dietary fiber while being very soluble in aqueous solution so as not to unduly disturb the sensual characteristics of a beverage. It has been further found as of the date of this patent application that oligosaccharides can exhibit sweetness synergy with high-intensity sweeteners, making their use all the more desirable. See HOE 96F356K; HOE 96/F357K; European Application Nos. PCT/EP97/06756 and PCT/EP97/06845.

Beverage compositions, particularly beverage compositions sweetened with a peptide sweetener such as aspartame, tend to lose sweetness over time especially under acidic conditions. It is accordingly desirable to develop beverage flavor systems which retain their sweetness characteristics over extended time intervals.

SUMMARY OF INVENTION

It has been found that under acidic aqueous conditions, oligosaccharides will hydrolyze to their sweeter monosaccharide units and thus stabilize the sweetness of a beverage composition. This feature will compensate for the decomposition over time of a peptide sweetener such as aspartame in a beverage. Thus, in accordance with the present invention it is possible to significantly extend the shelf life of acidified beverages such as iced tea, colas or others while providing for additional dietary fiber. It is important that the oligosaccharide does not completely hydrolyze into its component units too quickly or the fiber benefits would be lost and the sweetness of the component monosaccharides would have to be taken into account when formulating the beverage. In general, the oligosaccharides used in accordance with the present invention are believed to be those which decompose into their monosaccharide components by at least 0.5 per cent by weight but not more than about 50 per cent by weight over a period of four weeks under ambient conditions at a pH from about 3 to 4. Typically from about 2 to about 25 per cent by weight decomposition of the oligosaccharide over such time period and under the aforesaid conditions is believed desirable.

In general, acidified beverages with stabilized sweeteners and extended shelf life in accordance with the present invention include: (a) water; (b) an edible acid component present in an amount operable to maintain the pH of the beverage preferably in the range of from about 3 to about 4 and optionally up to about 5 or even up to less than about 6; (c) at least one high intensity peptide sweetener; and (d) a water soluble non-ingestible oligosaccharide. Preferred oligosaccharides are those which are non-digestible and undergo significant hydrolysis within about 4 weeks at ambient conditions within the aforesaid pH range such that the solvolyzed units contribute substantial sweetness to said beverage over time. Typically, the acid component is operable to maintain the pH of the beverage in the range of from about 3 to about 3.5 and more preferably in the range of from about 3 to about 3.25. Many acids may be employed, however, phosphoric acid, citric acid, malic acid, and mixtures of these acids are the most common.

Particularly preferred are non-digestible oligosaccharides such as oligofructose and inulin. Beverages in accordance with the invention may contain a peptide sweetener, such as aspartame, or both acesulfame K and aspartame. Preferred ratios by weight of aspartame to acesulfame K are from about 1:2 to about 10:1 with about 1:1 to about 5:1 being preferred for some beverages.

In the description which follows, colas and iced tea beverages are specifically exemplified; however, it is to be understood that the invention is not limited to any particular example or embodiment, rather the spirit and scope of the invention is set forth in the appended claims.

BRIEF DESCRIPTION OF DRAWINGS

The invention is described in detail below in connection with numerous examples and various figures in which.

DETAILED DESCRIPTION

Figure 1:
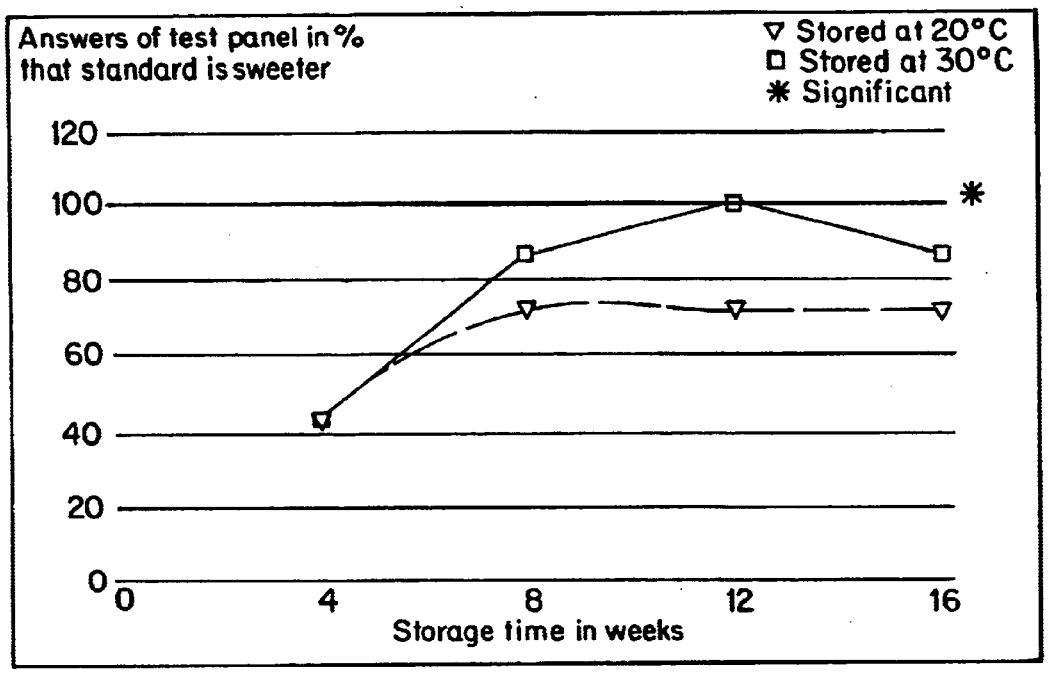
FIG. 1 is a graph of % of trained panelists finding a fresh cola composition containing oligofructose sweeter than an aged cola composition.

Monosaccharides are simple sugars containing a chain of 3–10 carbon atoms in the molecule, known as polyhydroxy aldehydes (aldoses) or ketones (ketoses). They are very soluble in water, sparingly soluble in ethanol, and insoluble in ether. The number of monosaccharides known is approximately 70, of which about 20 occur in nature. The remainder are synthetic. The existence of such a large number of compounds is due to the presence of asymmetric carbon atoms in the molecules. Aldohexoses, for example, which include the important sugar glucose, contain no less than four asymmetric atoms, each of which may be present in either D or L configuration. The number of stereoisomers rapidly increases with each additional asymmetric carbon atom.

A list of the best-known monosaccharides is given below:

| | |
|---|---|
| Trioses: | $CH_2OH.CHOH.CHO$, glycerose (glyceric aldehyde) |
| | $CH_2OH.CO.CH_2OH$, dihydroxy acetone |
| Tetroses: | $CH_2OH(CHOH)_2.CHO$, erythrose |
| | $CH_2OH.CHOH.CO.CHO$, erythrulose |
| Pentoses: | $CH_2OH.(CHOH)_3.CHO$, xylose, arabinose, ribose |
| | $CH_2OH.(CHOH)_2.CO.CH_2OH$, xylulose, ribulose |
| Methyl pentoses (6-deoxyhexoses): | $CH_3(CHOH)_4CHO$, rhamnose, fucose |
| Hexoses: | $CH_2OH.(CHOH)_4.CHO$, glucose, mannose, galactose, xylose |
| | $CH_2OH.(CHOH)_3.CO.CHOH$, fructose, sorbose |
| Heptoses: | $CH_2OH.(CHOH)_5.CHO$, glucoheptose, galamannoheptose |
| | $CH_2OH.(CHOH)_4.CO.CH_2OH$, sedoheptulose, mannoheptulose |

The term oligosaccharide refers to sugar composed of 2 or more monosaccharide units. Those sugars containing up to 6 units, many of which occur in nature, have been isolated as crystalline compounds. Fragments obtained by controlled hydrolysis of various polysaccharides with acid and consisting of monosaccharides up to 10 units, are also termed oligosaccharides.

The oligosaccharides may be considered as glycosides in which a hydroxyl (OH) group of one monosaccharide is condensed with the reducing group of another, with the loss of n−1 molecules of water (n=number of monosaccharide residues). This condensation process is shown below.

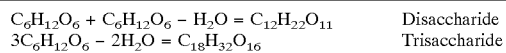

| | |
|---|---|
| $C_6H_{12}O_6 + C_6H_{12}O_6 - H_2O = C_{12}H_{22}O_{11}$ | Disaccharide |
| $3C_6H_{12}O_6 - 2H_2O = C_{18}H_{32}O_{16}$ | Trisaccharide |

If two sugar units are joined in this manner, a disaccharide results; a linear array of three monosaccharides thus joined by glycosidic bonds is a trisaccharide, and so forth. On the basis of the number of constituent monosaccharide units, the oligosaccharides are classified as disaccharides, trisaccharides, tetrasaccharides, and so on. No sharp distinction can be drawn between the oligosaccharides and polysaccharides; it is chiefly a matter of the latter's possessing higher molecular weights.

The monosaccharide units of an oligosaccharide may be alike, as in maltose, In which on hydrolysis gives two molecules of D-glucose, or different, as in sucrose or raffinose. Sucrose consists of D-glucose and D-fructose, and raffinose consists of D-glucose, D-fructose, and D-galactose residues.

Oligosaccharides within the context of the present invention are, in particular, water-soluble, and preferably, non-metabolizable oligosaccharides which comprise at least two monosaccharide components. The number of monosaccharide components which an oligosaccharide according to the claims may comprise is generally subject to no upper limit and is determined, in particular, by the water solubility usually required. Generally, oligosaccharides have 2 to 60 monosaccharide components.

Monosaccharides from which the oligosaccharides according to the claims are formed are preferably hexoses, which can be present as furanosides or pyranosides. Examples of monosaccharides are glucose, galactose and fructose. Preferred oligosaccharides are, in particular, inulins, oligofructoses, galactooligosaccharides, isomaltooligosaccharides, lactosucrose, maltose, glycosylusucrose, maltotetraose and trehalose.

The oligosaccharides according to the claims are known and are commercially available or may be prepared by methods known to those skilled in the art. Fructooligosaccharides are carbohydrates which belong to the fructan group. In the case of fructooligosaccharides, a distinction is made between inulin and oligofructose. Chemically, inulin is composed of polysaccharides and oligosaccharides which virtually all have the chemical structure GFn (G=glucose, F=fructose and n=the number of fructose units which are linked together as a chain). The degree of polymerization is 2 to 60 molecules. The linkages between the molecules are of a particular type for the preferred oligosaccharides. Preferred oligosaccharides have linkages of the β(2→1) form, which means that the molecules are indigestible for all higher organisms. Inulin functions as an energy reserve in numerous fruits and plants. In Europe, inulin is prepared industrially from chicory plants. Naturally occurring inulin molecules are extracted from the chicory root, purified and dried. Inulin contains oligofructose which is to an extent an inulin fraction having a low degree of polymerization (about 2 to 9). It is isolated from inulin by hydrolysis. Galactooligosaccharides are likewise carbohydrates which are chemically a mixture of poly- and oligosaccharides. The degree of polymerization is between 1 and 7 molecules. Galactooligosaccharides are produced industrially from lactose by enzymatic hydrolysis.

Isomaltooligosaccharides are produced from maltose-rich starch hydrolysates by enzymatic hydrolysis. Lactosucrose is produced from lactose, which is present in milk, using the enzyme fructofuranosidase and sucrose is produced from cane sugar. Maltose and trehalose are both disaccharides which consist of two molecules of glucose, but which differ from one another in the type of linkage between the two glucose components. Maltose is equal to sucrose with respect to digestibility, calorific value and cariogenicity. Glycosylsucrose is produced from a mixture of sucrose and starch hydrolysates by the enzyme transferase. It is equal in sweetness profile and calorific value to sucrose, but is markedly less sweet. Maltotetraose is a tetrasaccharide of four molecules of glucose.

The oligosaccharides can be used in the beverage according to the invention alone or in mixtures with one another.

The oligosaccharides can be added to beverages in various concentrations which primarily depend on the respective application. A weight ratio of oligosaccharide to high intensity sweetener of 10:1 to 10,000:1 in particular 500:1 to 5,000:1 based on the weight of mixture of oligosaccharide and sweetener, is of practical importance.

Owing to their chemical structure, which cannot be hydrolyzed by the human digestive enzymes, most of the oligosaccharides are not digested in the small intestine, but act as soluble fibers. Not until the large intestine are they fermented without residue by the beneficial microflora. This is principally carried out by the endogenous bifidobacteria. This process stimulates the growth of the endogenous bifobacteria and inhibits the growth of harmful bacteria, such as enterobacteriaceae or streptococci. A change of this type in the composition of the intestinal flora is considered to be beneficial to humans. Oligosaccharides having these properties are _lucagons termed "prebiotic", since they stimulate the development of the endogenous desirable bacteria in the digestive tract In addition, this activates the immune system and the synthesis of vitamins (e.g. $B_1$ and $B_{12}$) and improves the uptake of some minerals. The uptake of oligosaccharides of this type in a sufficient amount thus generally makes a positive contribution to the well-being and health of humans.

The consequence of this special metabolism is that these oligosaccharides supply only a very few calories to the body. In the large intestine, the microorganisms can convert the products into free fatty acids, some of which are absorbed. Owing to this metabolic process, the calorific value of inulin at only 1 kcal/g and of oligofructose at only 1.5 kcal/g is markedly below that of fact, fructose, glucose, sugars and starch.

The uptake of oligosaccharides of this type also causes typical fiber effects, since they increase the transit rate of the intestinal contents and they increase the stool weight, decrease the pH in the intestine, improve the ratio of HDL/LDL cholesterol, decrease the triglycerol and fat values in the blood and prevent constipation.

Oligosaccharides having the above-described properties have no effect on blood glucose level, do not stimulate insulin secretion and thus are suitable for diabetics.

Since no fructose or glucose is released by the oral flora during the metabolism of, for example, inulin, isomaltooligosaccharides or lactosucrose, these substances cause virtually no caries and no dental plaque.

Since fructo- and galactooligosaccharides, just as isomaltooligosaccharides and lactosucrose, give the product body in the amount added, since they are soluble fiber, the viscosity of the product is increased and thus the mouthfeel is markedly and highly pleasantly improved, actually without intrusive fibers in the product as are known from traditionally fiber-enriched beverages ("bran effect").

Glycosylsucrose, owing to its special mode of preparation, has the advantage of not being cariogenic, since the sucrose present therein cannot be fermented by the bacteria in the oral cavity. It thus has the same beneficial properties giving body in beverages as conventional saccharides, but without the hazard of causing caries.

A further advantage of oligosaccharides according to the information such as maltotetraose, maltose or trehalose is the improved technological properties, particularly with respect to foods other than beverages. In this case it has been found that bakery products and confectionery, for example, which are greatly improved with respect to the technological properties can be produced. However, since these oligosaccharides are markedly less sweet than commercially conventional sugars, increasing the sweetness using sweeteners is necessary. The sweeteners here also act is as taste intensifiers/enhancers, i.e. the sweet taste of the mixture of sweeteners and these oligosaccharides becomes much more sugar-like than would be expected.

The monosaccharide units forming an oligosaccharide are generally much more powerful sweetening agents than are the oligosaccharide itself. Fructose, for example, has a reported sweetening power of 1.2 to 1.8 times that of sucrose. Relative sweetening power of oligosaccharides are shown below in Table 1.

TABLE 1

Sweetening Power Of Oligosaccharides

| | Concentration in aqueous solution | Sweetening power in aqueous solution (sucrose = 1) |
|---|---|---|
| Inulin (powder) | 10% | 0.10 |
| Oligofructose (syrup) | 10% | 0.45 |
| Galactooligosaccharide (syrup) | 10% | 0.32 |
| Lactosucrose (powder) | 10% | 0.37 |

TABLE 1-continued

Sweetening Power Of Oligosaccharides

| | Concentration in aqueous solution | Sweetening power in aqueous solution (sucrose = 1) |
|---|---|---|
| Isomaltooligosaccharide (syrup) | 10% | 0.26 |
| Glycosylsucrose (syrup) | 10% | 0.29 |
| Maltotetraose (syrup) | 10% | 0.17 |
| Maltose (powder) | 10% | 0.36 |
| Trehalose (powder) | 10% | 0.32 |

Inulins used in the examples which follow have a degree of polymerization (Dp) of from about 2 to 60, averaging about 10; while the oligofructose products employed have a Dp of from 2 to 7.

The monosaccharides in inulin and oligofructose (sometimes referred to herein as monomers) are linked via $\beta(2–1)$ glycosidic bonds and are among the preferred species in practicing the invention. Xylooligosaccharides are linked by way of $\beta(1–4)$ glycosidic bonds.

The oligosaccharides of Table 1 are substantially non-metabolized, that is, have a dietary caloric value in humans of less than about 1.5 Kcal/g. Preferred oligosaccharides generally have a caloric value of less than about 5 Kcal/g and most preferably less than about 2 Kcal/g. The sweetening power of oligosaccharides is almost always less than their hydrolysis products. For the oligosaccharides listed above and generally speaking for oligosaccharides fructose, galactose, xylose, palatinose, soybean and maltose for all of these oligosaccharides their monomers are significantly sweeter. Typically, these oligosaccharides contain a monomer which is anywhere from 1.5 to 1,000 times as sweet (in terms of sweetening power) than the corresponding oligosaccharide. At least two times as sweet is desirable while instances where a monomer is at least about 4 times as sweet in terms as sweetening power than the oligosaccharide is even more preferred. In general, preferred oligosaccharides include those in which the monomers are hexoses or pentoses. As to the degree of polymarization, oligofructoses in general have approximately two to twenty monomer units while inulins have a maximum of about sixty and typically around 20 monomer units. Different grades may vary.

EXAMPLES

Oligosaccharides are utilized in making the acidified beverages in accordance is with the present invention as described hereinafter.

Example 1—Iced Tea/Oligofructose

Iced tea compositions were prepared having a pH of about 3 and a sucrose-equivalent sweetness of 7, that is, the beverage was equal sweet to a 7% sucrose solution. Typically, the ingredients of Table A were simply admixed under ambient conditions, the Raftilose soluble fiber being added first to the water since it is more difficult to dissolve than the other components. After the beverages were prepared, they were heated to about 195° F. and bottled so as to prevent spoilage.

TABLE A

Iced Tea/Oligofructose

| Ingredient | Gram |
| --- | --- |
| Raftilose P95 | 25.000 |
| Water | 946.931 |
| Maltodextrin M100 | 23.250 |
| Citric acid | 2.000 |
| Tea powder | 2.060 |
| Tea essence | 0.320 |
| Lemon flavor | 0.080 |
| APM | 0.181 |
| Acesulfame K | 0.078 |
| Total | 1000.000 |

The ingredients listed in Table A were sourced as appearing in Table B.

TABLE B

Ingredient Sourcing

| Ingredient | Product Description & Source |
| --- | --- |
| Maltodextrin | Maltrin M100; Grain Processing Corp.; Muscatine, LA; 319-982-1983 |
| Tea Powder | Instant Dark Tea Powder #7692; Fidco; Folon, OH; 800-446-4838 |
| Tea Essence | Tea Essence #8030; Fidco; Folon, OH; 800-446-4838 |
| Acesulfame K | Sunett ® Brand Sweetener; Nutrinova, Inc.; Somerset, NJ; 800-786-3883 |
| Lemon Flavor | Microseal Natural Lemon Flavor #9/79K404; Dragoco; Totowa; NJ; 2O1-256-3850 |
| Raftilose P95 | Oligofructose; Orafti, S.A. Tienen, Aandrenstraat, Belguim |

Example 2—Iced Tea/Inulin

Following generally the procedure and using the ingredients set forth in Example 1, except that Raftiline ST (inulin, also obtained from Orafti, S.A.) was used, the beverage of Table C was prepared having a pH of 3.4:

TABLE C

Iced Tea/Inulin Formulation

| Ingredients | Gram |
| --- | --- |
| Raftiline ST | 25.000 |
| Water | 946.909 |
| Maltodextrin | 23.350 |
| Citric acid | 2.000 |
| Tea powder | 2.060 |
| Tea essence | 0.320 |
| Lemon flavor | 0.080 |
| APM | 0.197 |
| Sunett | 0.084 |
| Total | 1000.000 |

Examples 3–35

Compositions prepared in accordance with Example 1 were aged at 40° F., 70° F., and 90° F. over a period of weeks. The aged compositions were compared with fresh compositions by a panel of five trained panelists. The results appear in Table D (Examples 3–20), which lists the relative sweetness of the aged composition to the fresh composition.

Despite the fact that the high intensity sweetener in the beverages is losing its potency (see Figures hereafter appearing). The beverages in accordance with the invention maintain their sweetness or are even sweeter than a fresh sample.

TABLE D

Iced Tea With Oligofructose

| Weeks Of Storage | 40° F. | 70° F. | 90° F. |
| --- | --- | --- | --- |
| 2 | close to control in sweetness less musty taste less linger less sweet | less sweet less tea flavor musty old note less linger off green flavor | less sweet less tea flavor |
| 4 | sweeter blend tea flavor good taste less sweet | close to slightly high in sweetness musty tea note more rounded | slightly sweeter tea flavor disappears quickly off note |
| 8 | close to control clean tea taste low flavor slightly sweeter | slightly sweeter musty unclean taste low flavor | sweeter than control good tea flavor musty old note |
| 12 | slightly high sweet musty syrup | low tea close to sweet musty | slightly sweeter strong syrup musty |
| 16 | similar sweet less flavor | musty slightly sweeter | slightly sweeter musty green taste |
| 20 | sweeter syrupy taste offnote | low flavor musty note low tea flv. | Less tea flavor sweeter off note |

Following procedure of Example 2, samples of Iced Tea prepared in the invention containing inulin were heat aged at 40° F., 70° F. and 90° F. over a period of weeks. The samples were then compared as before with fresh samples of the same composition. Results appear in Table E for Examples 21–35.

Again, it can be seen that the aged samples maintained or even increased in sweetness over time.

TABLE E

Iced Tea With Inulin

| Storage Time (weeks) | 40° F. | 70° F. | 90° F. |
| --- | --- | --- | --- |
| 4 | dose in sweetness | slightly less sweet | close in sweetness |
| 8 | close in sweetness | close in sweetness | slightly sweeter than fresh control |
| 12 | close in sweetness | sweeter than fresh control | close in sweetness |
| 16 | slightly sweeter than a fresh control | sweeter than fresh control | sweeter than fresh control |
| 20 | close in sweetness with fresh control | sweeter than fresh control | sweeter than fresh control |

Example 36–47 Cola with Oligofructose

Following the above procedures, Cola samples were prepared, tested and analyzed using the protocol appearing below in Table F.

TABLE F

| Cola/Oligofructose Formulation | |
| --- | --- |
| Cola base: | Dohler 6030; 5 g/l |
| pH: 3.0 | |
| % SE: | approx. 11 |
| Acid: phosphoric acid | (included in the cola base) |
| APM/acesulfame K: | ratio: 70/30 = 305 ppm/ 130 ppm |
| Preservation: | 400 ppm Potassium Sorbate and 300 ppm Velcorin. Velcorin addition after carbonation |
| Storage Temp. | Room temperature (approx. 70° F. = 20° C.), 90° F. = 30° C.) |
| Intervals of sensory test and APM analysis | 0,4,8,12,16,20 weeks |
| % Raftilose P95 | about 2.5% |

Examples 48–59—Cola with Inulin

Following the above procedures, additional cola samples were prepared, tested and analyzed using the protocol appearing below in Table G.

TABLE G

| Cola/Inulin Formulation | |
| --- | --- |
| Cola base: | Dehler 6030; 5 g/l |
| pH: 3.0 | |
| % SE: | approx. 11 |
| Acid: phosphoric acid | (included in the cola base) |
| APM/acesulfame K: | ratio: 70/3O = 305 ppm/ 130 ppm |
| Preservation: | 400 ppm Potassium Sorbate and 300 ppm Velcorin. Velcorin addition after carbonation |
| Storage Temp. | Room temperature (approx. 70° F. = 20° C.), 90° F. = 30° C.) |
| Intervals of sensory test and APM analysis | 0,4,8,12,16,20 weeks |
| % Raftilose ST: | about 2.5% |

Potassium sorbate for the Colas was obtained from Nutrinova, Frankfurt, Germany while the Cola base 6030 and Velcorin were obtained from Dohler Citrus NBI GmbH, D-64295 Darmstadt, Riedstrass 7–9 Germany and Bayer AG, Leverkusen, Germany respectively.

Figure 2:
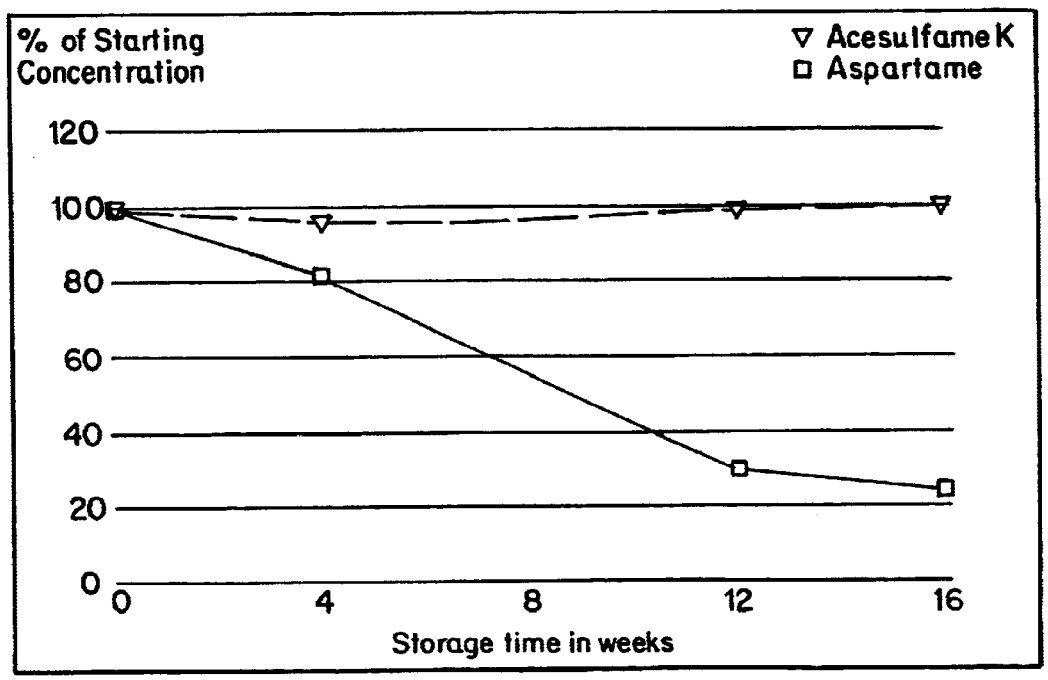
FIG. 2 is a graph of the stability of acesulfame K and aspartame in an oligofructose containing cola beverage.
Figure 3:
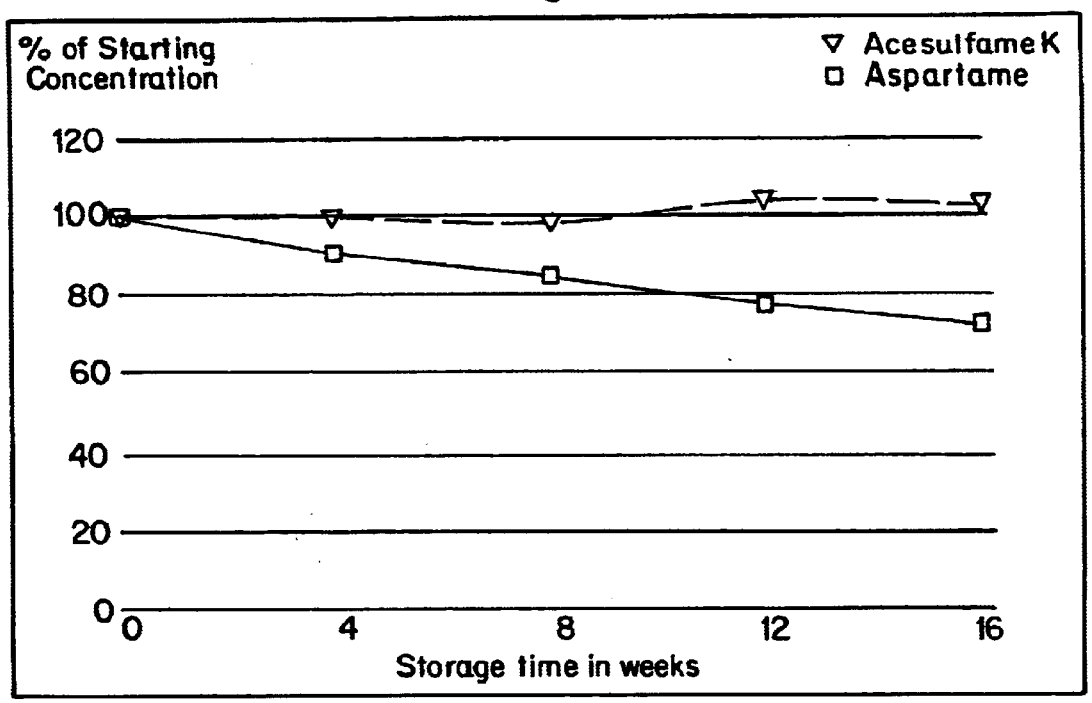
FIG. 3 is a graph of the stability of acesulfame K and aspartame in an oligofructose containing cola beverage.
Figure 4:
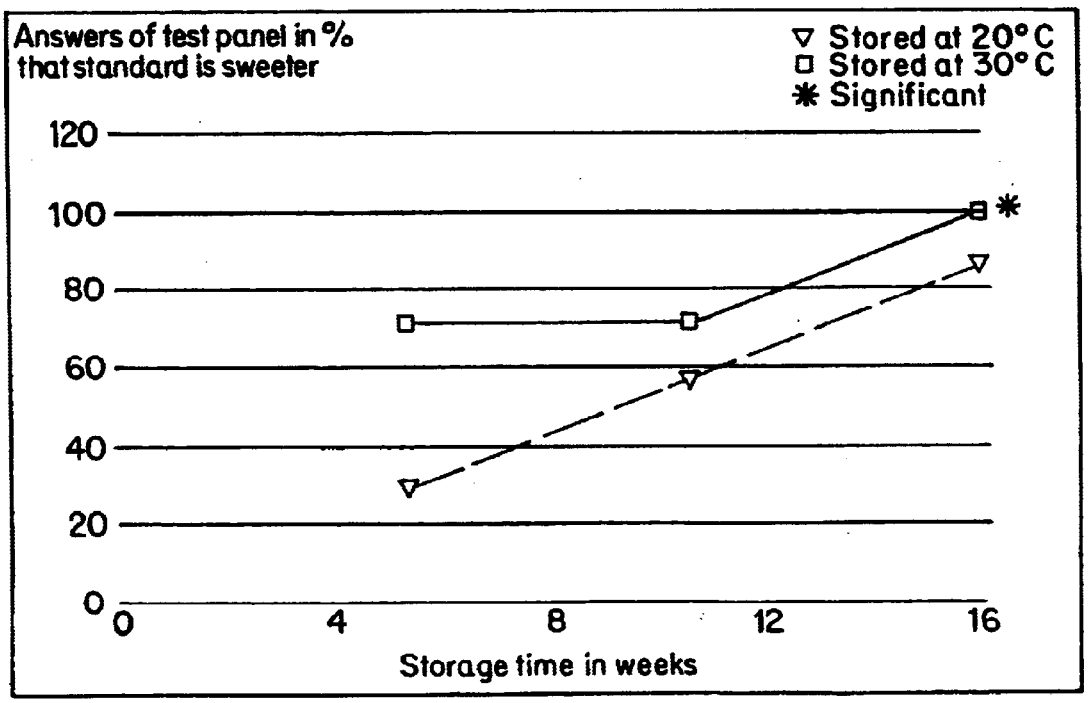
FIG. 4 is graph of % of trained panelists finding a fresh cola composition containing inulin sweeter than an aged cola composition.
Figure 5:
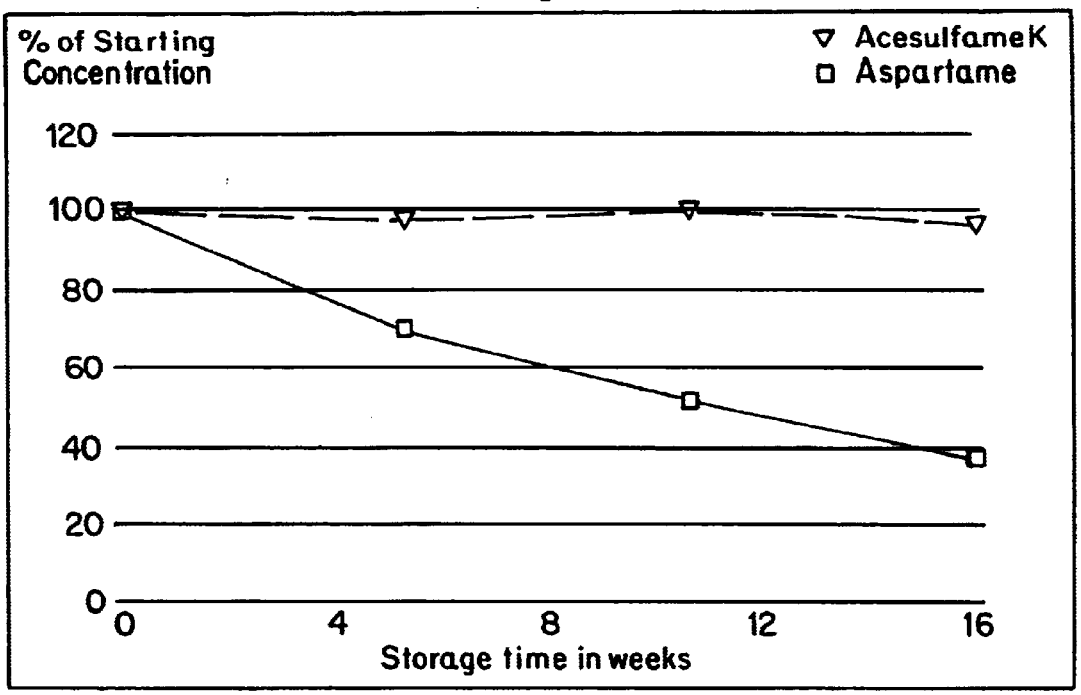
FIG. 5 is a graph of the stability of aspartame and acesulfame K in an inulin containing cola beverage.
Figure 6:
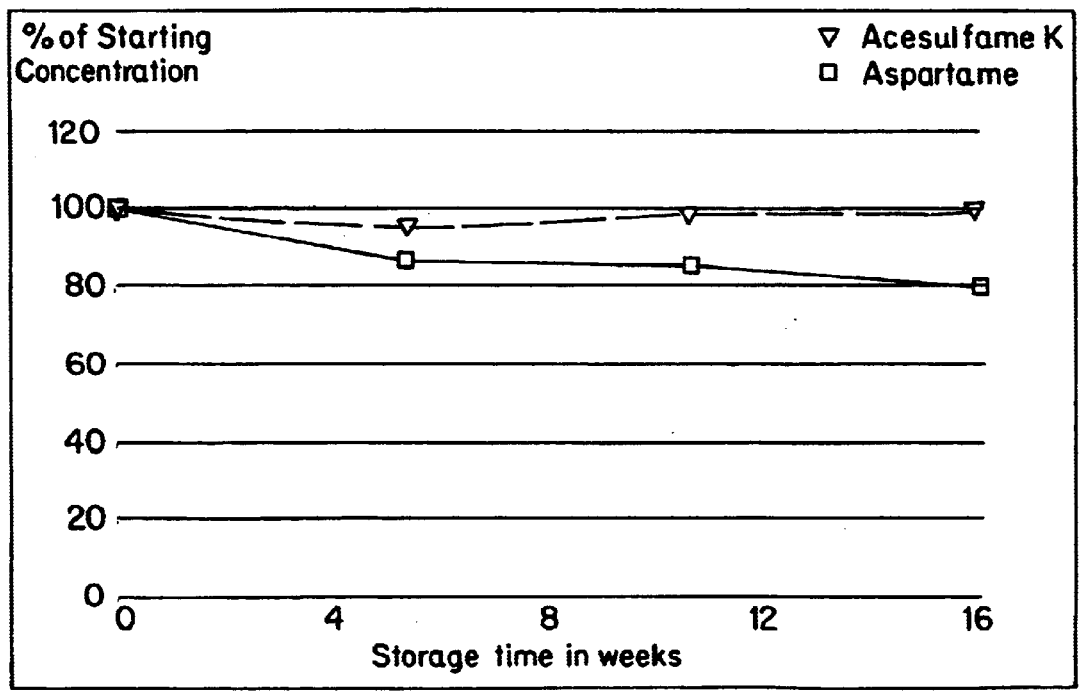
FIG. 6 is a graph of the stability of acesulfame K and aspartame in an inulin containing cola beverage.

The cola samples were aged at approximately 20° C. (70° F.) and 30° C. (90° F.) over a period of weeks as indicated in the Figures. Samples were drawn and compared with fresh samples for sweetness using 7 trained panelists as before. Samples were also analyzed for aspartame content. FIGS. 1–3 show results for the oligofructose containing colas while FIGS. 4–6 show results for the inulin—containing colas. It can be seen in FIGS. 1 and 4 that the aged samples maintained their sweetness over time and at times were even sweeter than fresh beverage. This is quite remarkable in view of the fact that aspartame in the beverages was markedly depleted over the intervals measured. Note particularly FIGS. 2 and 5.

Examples 60–65—Hydrolysis of Oligosaccharides in Cola Beverages

Cola beverages were prepared in accordance with the above with the same ingredients unless otherwise indicated at a sugar equivalent sweetness of 14 and stored at 20° C. for the time periods and at the pH values indicated below in Tables H through J. Hydrolysis is expressed in % of initial amount of oligosaccharide; that is the per centage of the initial oligosaccharide depleted.

TABLE H

Oligofructose (Raptilose ® P95) In Cola

| TIME | HYDROLYSIS (%) pH 3.5 |
| --- | --- |
| 2 weeks | 5 |
| 3 months | 33 |
| 6 months | 44 |

TABLE I

Inulin (Raftiline ® ST) In Cola

| TIME | HYDROLYSIS (%) pH 3.5 |
| --- | --- |
| 2 weeks | 4 |
| 3 months | 16 |
| 6 months | 29 |

Examples 66–71—Hydrolysis of Oligosaccharides in Iced Tea Beverages

Iced Tea Beverages were prepared as indicated above with oligofructose and inulin with the same ingredients unless otherwise indicated in Table J. Samples were stored at 40° F.; 70° F. and 90° F. at and analyzed at approximately 6 months. Hydrolysis is indicated by the increase in fructose (initial amount =0) and decrease in oligosaccharides.

TABLE J

Hydrolysis of Oligosaccharides In Iced Tea at Six Months
Initial concentration of oligosaccharide was 2.5%
Oligofructose (Raftilose ® P95)
Inulin (Raftiline ® ST)

| | pH 3.0 | | | pH 3.25 | | |
| --- | --- | --- | --- | --- | --- | --- |
| Storage Temp. | 40° F. | 70° F. | 90° F. | 40° F. | 70° F. | 90° F. |
| Fructose % | 0.31 | 1.08 | 1.89 | 0.24 | 1.18 | 2.14 |
| Inulin % | | | | 1.90 | 1.00 | 0.10 |
| Oligofructose % | 1.60 | 0.9 | 0.03 | | | |

As can be seen from the above, preferred oligosaccharides may hydrolyze in the range of from about 0.5 to about 50 per cent in about 4 weeks when stored at about 70° F. at a pH of from about 3 to about 4.

In general, hydrolysis of from 0.5% or more (but less than about 50%) within 4 weeks under these conditions is deemed significant hydrolysis. Typically, beverages prepared in accordance with the invention contain oligosaccharides which hydrolyze by at least 1 per cent (but less than 50%) by weight over a period of 4 weeks at a pH of from about 3 to about 4 at a temperature of about 70° F.; whereas preferred beverages contain oligosaccharides which hydrolyze in the beverage by at least about 3 per cent by weight (but less than 50%) over a period of 4 weeks at a pH of from about 3 to 4 at a temperature of about 70° F. Particularly preferred oligosaccharides hydrolyze to a monosaccharide such as fructose which contributes sweeteners to the beverage over time to compensate for the decomposition of a high intensity sweetener such as aspartame.

Further illustration is believed unnecessary, the invention having been described in detail and exemplified in numerous embodiments. Various modifications of those embodiments will be readily apparent to those of skill in the art within the spirit and scope of the appended claims.

What is claimed is:

1. An acidified beverage with stabilized sweeteners and extended shelf life comprising:
   (a) water;
   (b) an edible acid component present in an amount suitable to maintain the pH of the beverage in the rage of from about 3 up to less than about 6;
   (c) at least one high intensity peptide sweetener; and
   (d) a water-soluble oligosaccharide fiber which undergoes at least partial hydrolysis within about 4 weeks at ambient conditions within the aforesaid pH range and the hydrolyzed units of which sweeten said beverage; and which oligosaccharide is select from the group consisting of inulins, oligofructose and fructans and wherein the ratio of oligosaccharide to high intensity, sweetener is 500:1 to 5,000:1.

2. The beverage according to claim 1, wherein said acid component maintains the pH of the beverage in the range of from 3 to about 3.5.

3. The beverage according to claim 1, wherein said acid component maintains the pH of the beverage in the range of from about 3 to about 3.25.

4. The beverage according to claim 1, wherein said acid component comprises phosphoric acid.

5. The beverage according to claim 4, wherein said acid component further comprises citric acid.

6. The beverage according to claim 1, wherein said acid component comprises citric acid.

7. The beverage according to claim 1, wherein said acid component comprises malic acid.

8. The beverage according to claim 1, wherein said oligosaccharide comprises hexose or pentose monosaccharide units.

9. The beverage according to claim 1, wherein the oligosaccharide is oligofructose.

10. The beverage according to claim 1, wherein the oligosaccharide is insulin.

11. The beverage according to claim 1, wherein said peptide sweetener is aspartame.

12. The beverage according to claim 1, wherein the beverage contains both acesulfame K and aspartame.

13. The beverage according to claim 12, wherein the ratio of aspartame to acesulfame K is from about 1:2 to about 10:1.

14. An acidified beverage comprising:
   (a) water;
   (b) a flavor component selected from the group consisting of tea flavor and cola flavor;
   (c) an edible acid component present in an amount suitable to maintain the pH of the beverage in the range of from about 3 to about 4;
   (d) at least one high intensity sweetener composition;
   (e) a water-soluble oligosaccharide fiber selected from the group consisting of inulins, oligofructose and fructans, said inulins, oligofructans and fructans having a caloric value of less than about 5 Kcal/g.

15. The beverage according to claim 14, wherein said oligosaccharide is oligofructose.

16. The beverage according to claim 15, wherein said high intensity sweetener composition is aspartame.

17. The beverage according to claim 15, wherein said high intensity sweetener composition is acesulfame K.

18. The beverage according to claim 15, wherein said high intensity sweetener composition is aspartame and acesulfame K.

19. The beverage according to claim 18, wherein the weight ratio of aspartame to acesulfame K is from about 1:2 to about 10:1.

20. The beverage according to claim 1, wherein said water-soluble oligosaccharide fiber undergoes hydrolysis by about 0.5–50 per cent by weight of said oligosaccharide fiber within about four (4) weeks at ambient conditions within the pH range of 3 to 4 and the hydrolyzed units of which sweeten said beverage.

* * * * *